Figure 1:
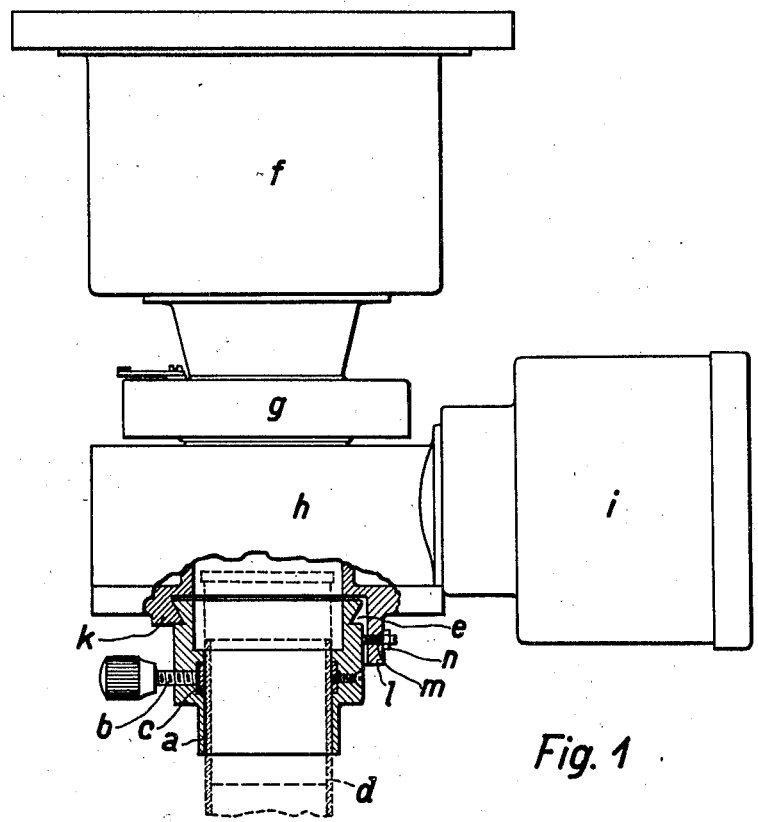

Sept. 17, 1935.  G. REINERT  2,014,538

PHOTOGRAPHIC CAMERA

Filed March 15, 1934

Inventor:
Guido Reinert

Patented Sept. 17, 1935

2,014,538

UNITED STATES PATENT OFFICE 2,014,538

PHOTOGRAPHIC CAMERA

Guido Reinert, Jena, Germany, assignor to the firm Carl Zeiss, Jena, Germany

Application March 15, 1934, Serial No. 715,671
In Germany March 16, 1933

2 Claims. (Cl. 88—24)

Images viewed in an optical observation instrument are sometimes photographed by means of a photographic camera which may be attached to the observation instrument itself. Frequently, the image is focused at by means of a focusing screen, or a telescopic system, disposed at the camera and struck by the imaging rays directed to it by a ray-dividing prism disposed in the ray path. The intensity of the image obtained by means of this ray division is very often not great enough to guarantee a really good focusing, and it is therefore necessary sometimes to focus the object by looking through the observation instrument direct, which means however that the camera is to be removed from the instrument. When the viewed object is highly magnified by the optical system of the observation instrument, which is often the case for instance when a microscope is used, the shocks the instrument has to suffer when the camera is removed and replaced will frequently entail an undesired displacement of the object in the field of view or make it disappear. It is therefore desirable to improve the conditions of the observation as regards both finding and focusing the image by so attaching the camera to this instrument as to avoid practically any such shocks. The same holds good with respect to a drawing apparatus, a projection prism or the like, to be attached to the observation instrument. The difference of flexure of the observation instrument without and with camera or the like, which might be disturbing, may be neutralized by a corresponding weight to be attached in a convenient manner when an observation is to take place.

The object of the invention is a photographic camera which is to be used together with an optical observation instrument and has an aperture for admitting the light rays. The possibility of attaching the camera to the observation instrument in such a manner as to avoid practically any shocks may be attained, according to the invention, by means of a ring detachably connected to the ocular tube of the said instrument when, according to the invention, the ring has a peripheral groove into which there may extend at least one projection of the camera, and when the camera also rests against the ring at at least one point which is opposite the projection and lies near the groove. To provide that the camera is safely attached, it is required to rest on the ring at three points. The camera may rest against the ring by means of two projections provided on two opposite sides of the light-entrance aperture, when one of the projections extends over a sufficiently long part of the circumference. It is advisable to provide that one lateral surface of the groove is conical and corresponds to a conical surface of the projection extending into the groove and that the camera to be attached rests against the ring by means of two screws provided on the other projection and adjustable in the directions of their axes. The own weight of the camera will prevent the camera from being axially or otherwise displaced, and this regardless of whether the axis of the ring assumes a vertical or a horizontal position, the exact position relative to the observation instrument being adjustable by means of the screws. As the ring belonging to the camera may remain on the observation instrument also when this instrument is looked through and adjusted, the camera may be attached or removed simply by placing it on or lifting it from the instrument, and this without the necessity of manipulating clamping screws or similar parts, which would inevitably entail shocks.

Figure 2:
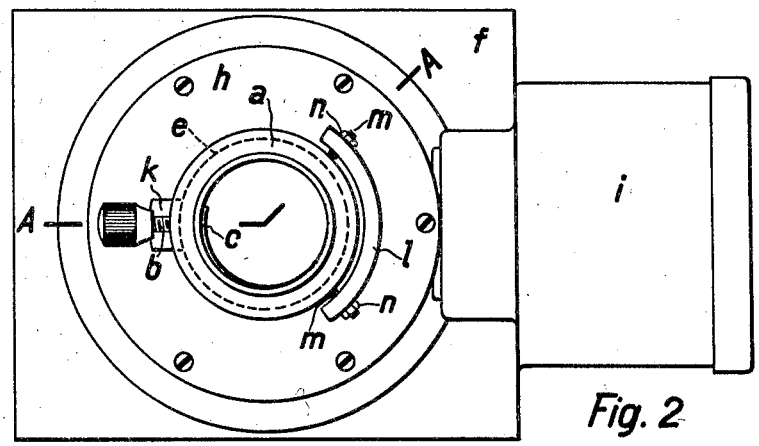

In the accompanying drawing, which illustrates a constructional example of the invention, Figure 1 shows the example in elevation, partly in section through the line A—A in Figure 2, and Figure 2 represents the example in a view from below.

A ring $a$ which is provided with a peripheral conical groove $e$ at its upper end, is clamped to the ocular tube $d$ of a microscope by means of a screw $b$ and a slitted elastic ring $c$. The photographic camera to be attached consists of the camera $f$ proper having a central shutter $g$ and a prism housing $h$ with a lateral part $i$ for holding the focusing screen. The prism housing $h$ has a projection $k$ which corresponds to the groove $e$, and a cylindrical projection $l$ which is opposite the projection $k$ with respect to the light-entrance aperture of the camera. In the projection $l$ are provided two screws $m$ held in position by two nuts $n$, the axes of these two screws lying in a peripheral line near the groove $e$.

When the camera is to be attached to the ocular tube $d$, it is so placed on the ring $a$ that the projection $k$ extends into the groove $e$ and that the screws $m$ rest against the ring $e$. The camera may be made ready for use by displacing the screws $m$ along their axes in such a manner that the axis of the camera coincides with the optical axis of the microscope. The camera may be raised from the ocular tube $d$ at any time. When replaced again, the camera assumes at once the correct position to which it had been adjusted originally. The microscope will not have to suffer any detrimental shocks when the camera is carefully placed on and raised from the objective.

I claim:

1. A photographic camera to be used together with an optical observation instrument, having an aperture for the entrance of the light rays, this camera being provided with two projections disposed on opposite sides of the light entrance aperture of the camera and with a ring adapted to be attached to the ocular tube of the observation instrument, the ring having a peripheral groove, the one of the said projections extending into this peripheral groove, and two screws adjustable in the direction of their axes and provided in the said other projection, these two screws lying against the said ring, near the groove.

2. A photographic camera to be used together with an optical observation instrument, having an aperture for the entrance of the light rays, this camera being provided with two projections disposed on opposite sides of the light entrance aperture of the camera and with a ring adapted to be attached to the ocular tube of the observation instrument, the ring having a peripheral groove, the one of the said projections extending into this peripheral groove, and at least one punctiform element of the other of the said projections lying against the said ring, near the groove, the surface of the said groove consisting of a conical surface and a plane surface at right angles to the axis of the ring, and the profile of the first said projection corresponding to that of the said groove.

GUIDO REINERT.